Figure 8:
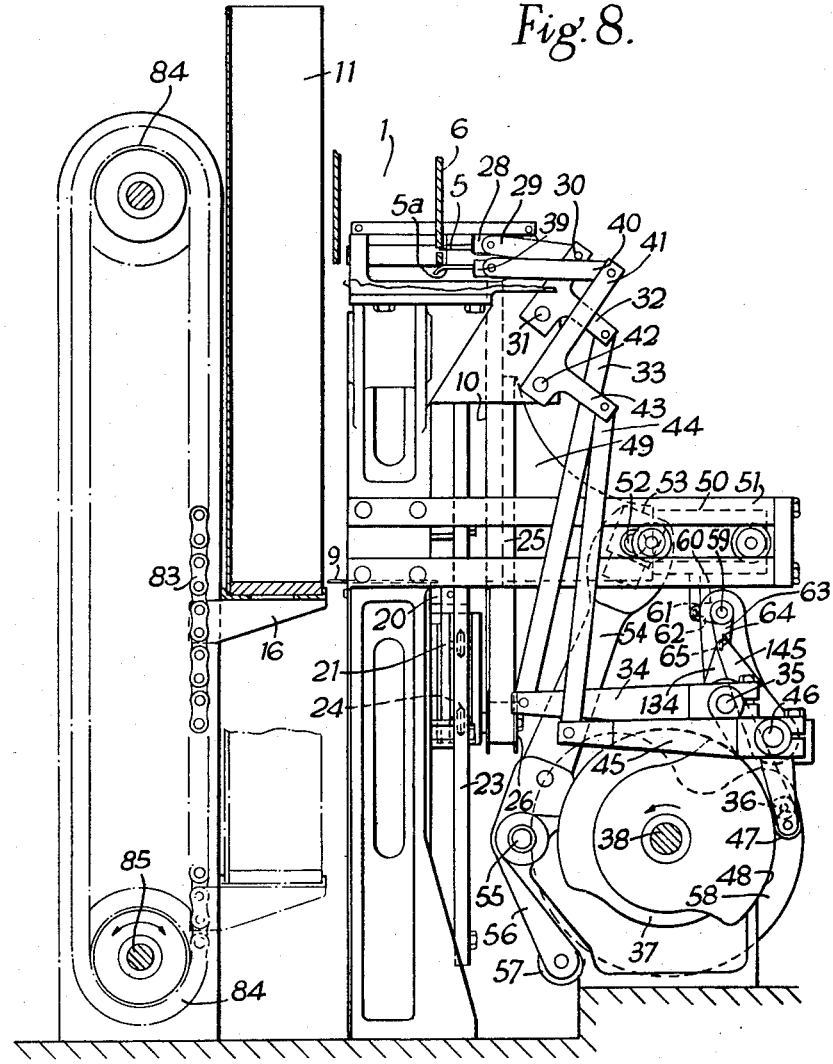

Oct. 17, 1961    G. F. PEMBROKE    3,004,374
APPARATUS FOR COLLECTING CIGARETTES IN RECEPTACLES
Filed July 10, 1958    7 Sheets-Sheet 1
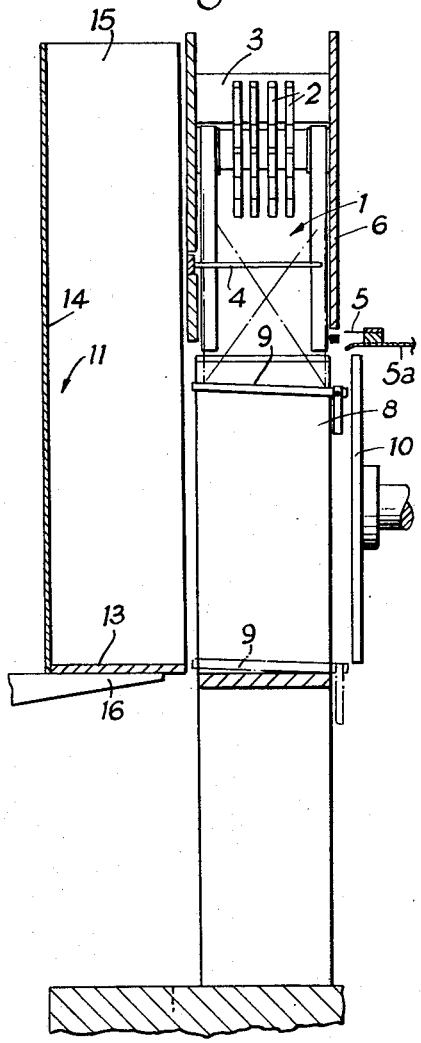
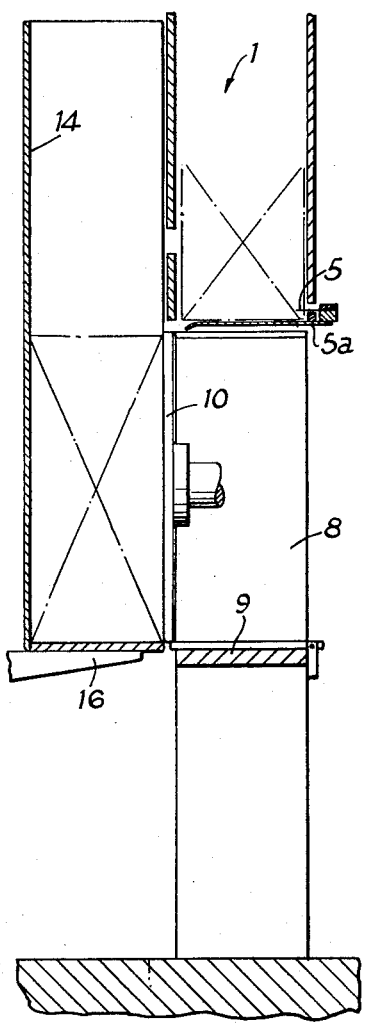
INVENTOR
George Frederick Pembroke
BY
Watson, Cole, Grindle & Watson
ATTORNEYS Oct. 17, 1961  G. F. PEMBROKE  3,004,374
APPARATUS FOR COLLECTING CIGARETTES IN RECEPTACLES
Filed July 10, 1958  7 Sheets-Sheet 2
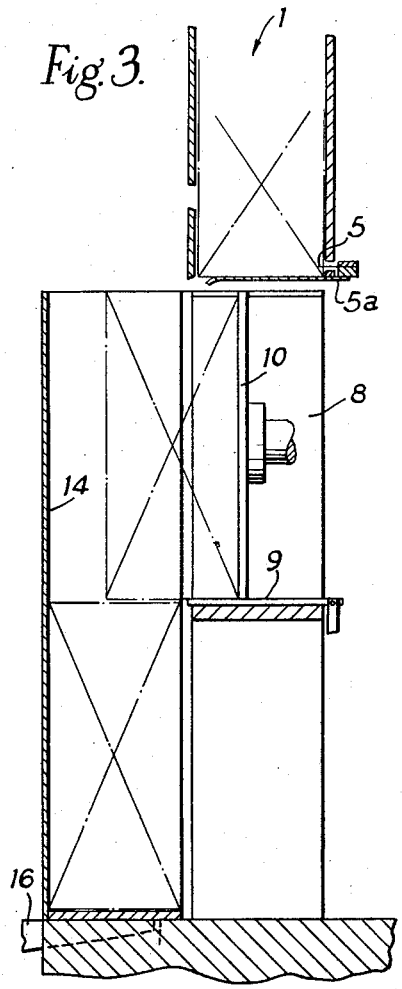
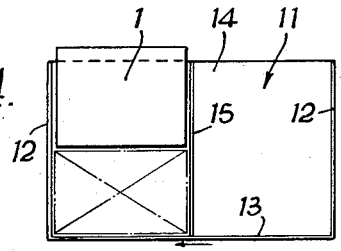
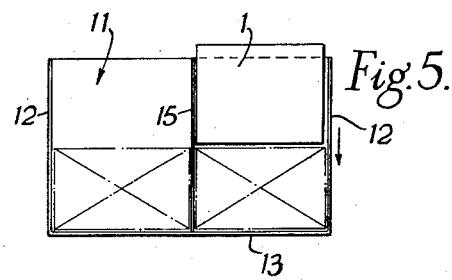
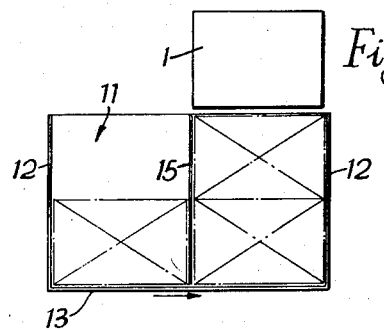
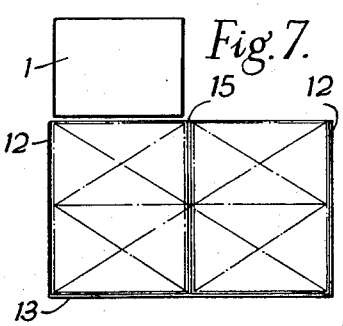
INVENTOR
George Frederick Pembroke
BY
Watson, Cole, Grindle & Watson
ATTORNEYS

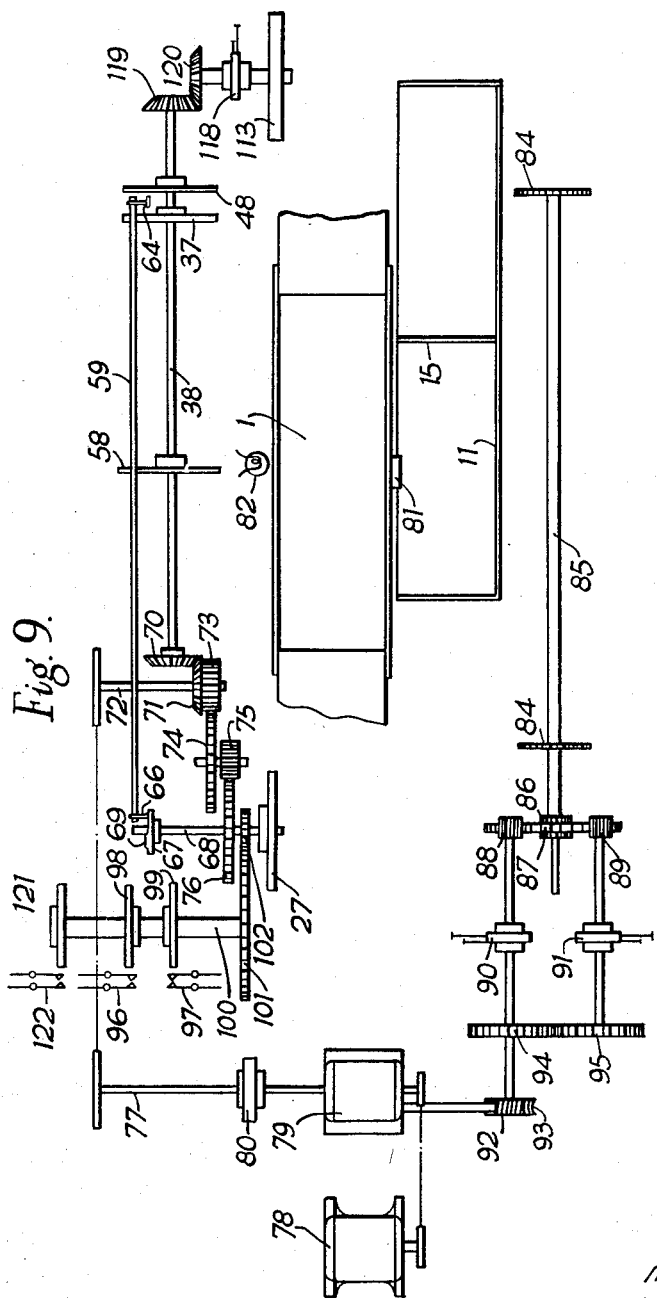

Oct. 17, 1961  G. F. PEMBROKE  3,004,374
APPARATUS FOR COLLECTING CIGARETTES IN RECEPTACLES
Filed July 10, 1958  7 Sheets-Sheet 5
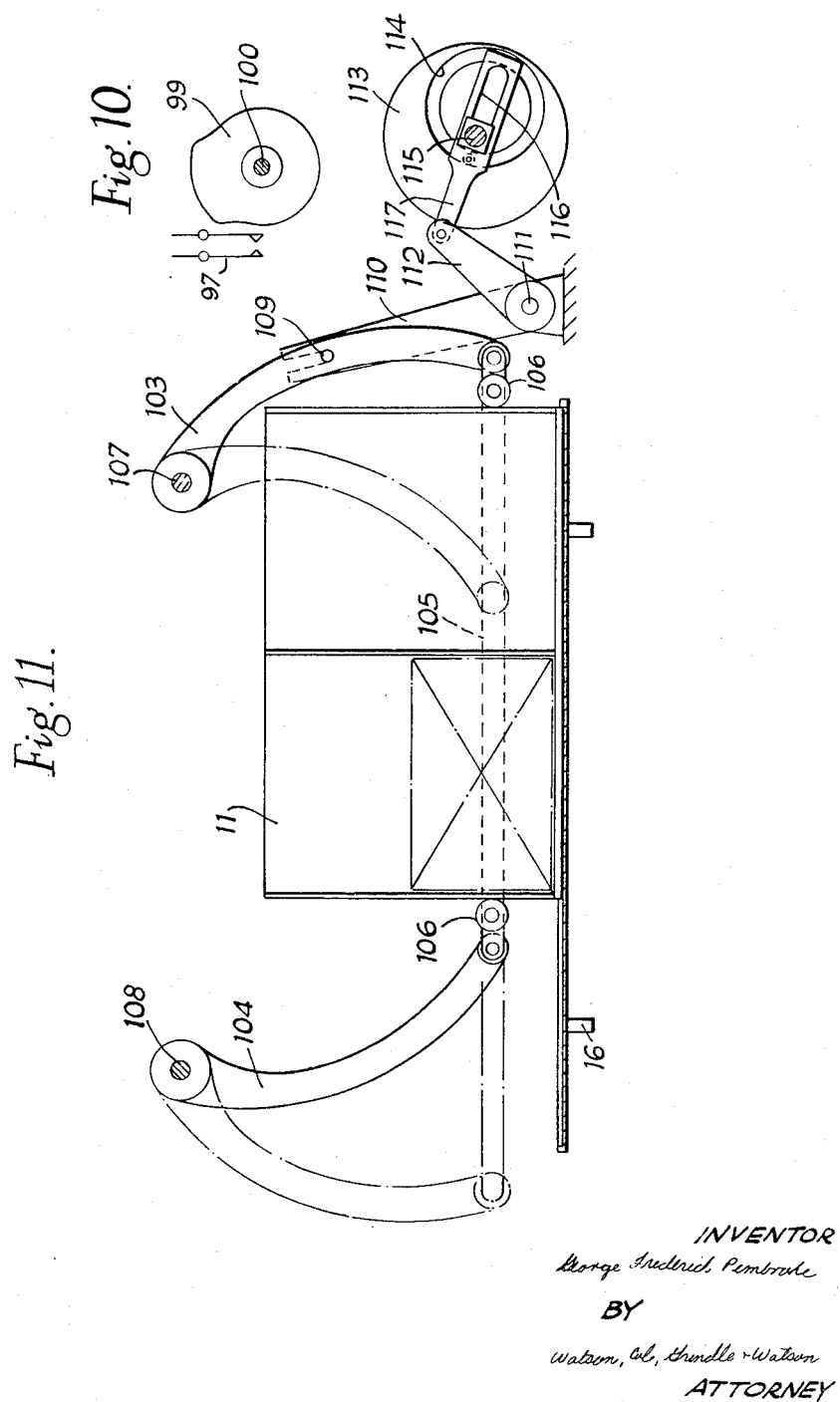
INVENTOR
George Frederick Pembroke
BY
Watson, Cole, Grindle & Watson
ATTORNEY Oct. 17, 1961
G. F. PEMBROKE
3,004,374
APPARATUS FOR COLLECTING CIGARETTES IN RECEPTACLES
Filed July 10, 1958
7 Sheets-Sheet 6
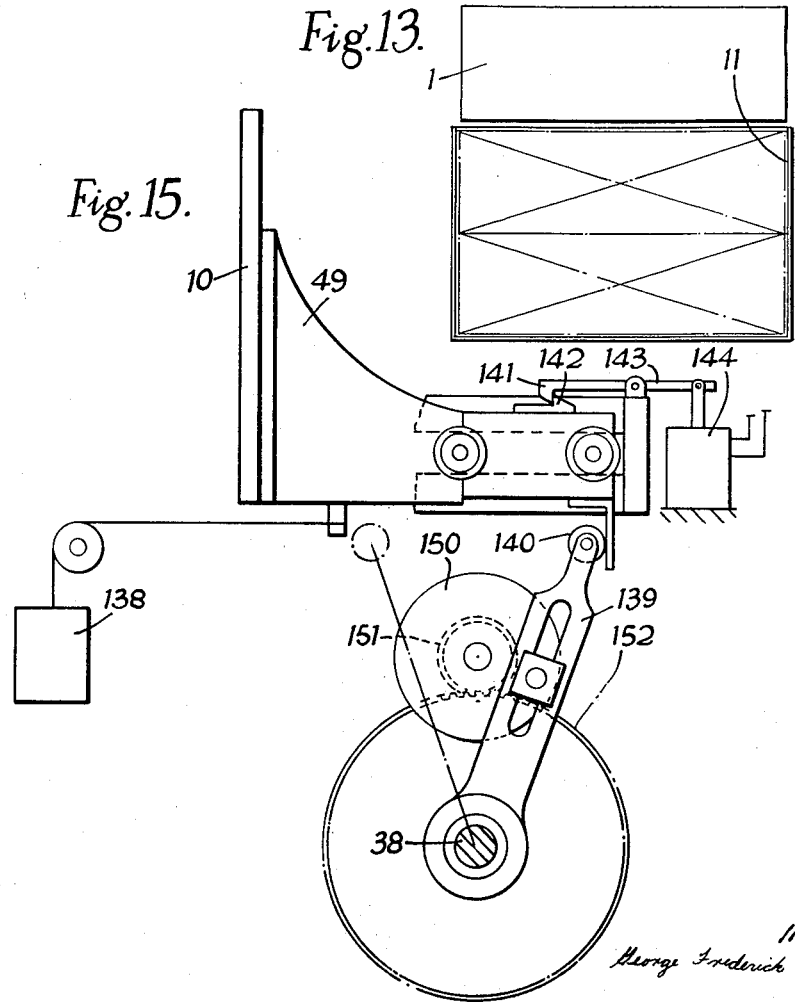

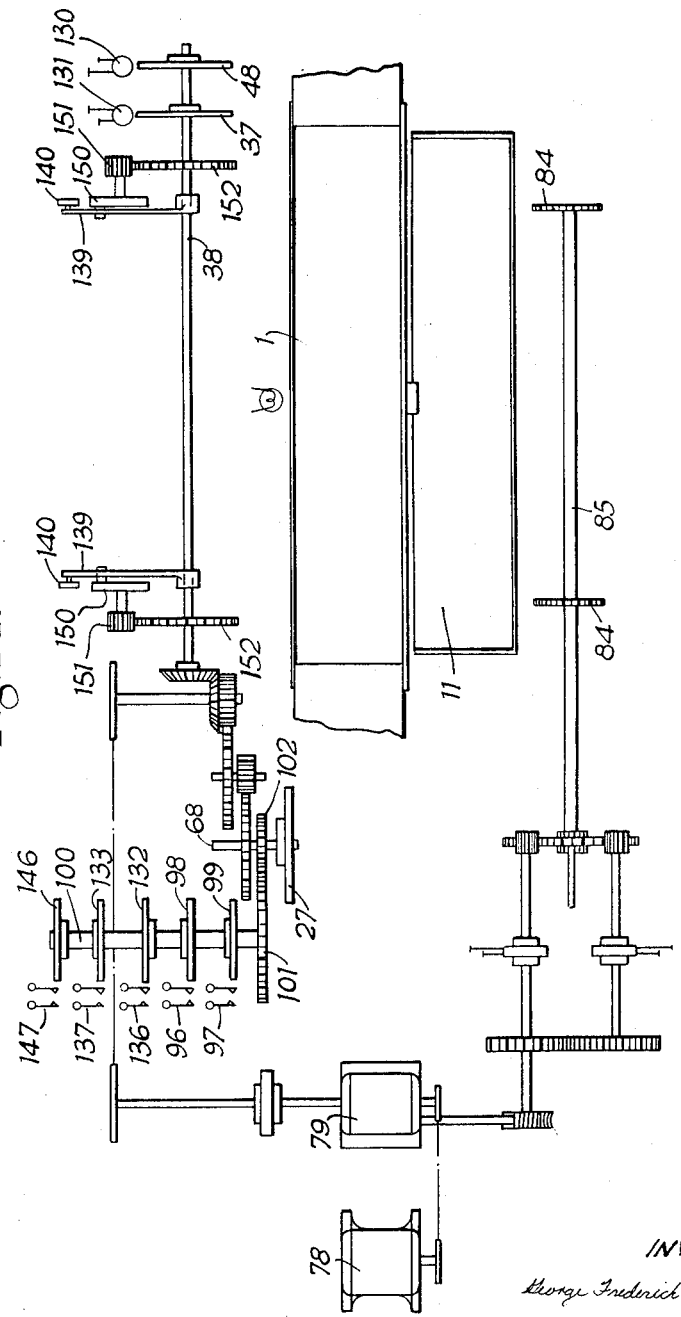

United States Patent Office 3,004,374
Patented Oct. 17, 1961

3,004,374
APPARATUS FOR COLLECTING CIGARETTES IN RECEPTACLES
George Frederick Pembroke, Deptford, London, England, assignor to Molins Machine Company Limited, London, England, a British company
Filed July 10, 1958, Ser. No. 747,738
Claims priority, application Great Britain July 16, 1957
6 Claims. (Cl. 53—148)

This invention concerns improvements in or relating to apparatus for collecting cigarettes in receptacles (e.g. cigarettes coming from one or more cigarette-making machines).

In the complete specification and drawings of copending U.S. patent application Serial No. 690,475, now U.S. Patent No. 2,919,529, there is disclosed apparatus in which cigarettes are fed downwardly into an open-sided receptacle so as to be arranged in a stack (with the end faces of the cigarettes forming the sides of the stack and facing the open sides of the receptacle) the stack being supported on a platform which moves gradually downwardly in the receptacle to allow more cigarettes to be added to the top of the stack. According to one arrangement disclosed in the above-mentioned specification, the lower part of the stack is eventually pushed sideways from the receptacle into a suitable container (the upper part of the stack being meanwhile suitably supported) after which the platform is again raised and the feeding of cigarettes proceeds as before.

The container into which the cigarettes are pushed from the receptacle is what is commonly described as a cigarette tray, which is used for transporting cigarettes from the cigarette-making machine to a packing machine or elsewhere. Cigarette trays are usually required to be deep enough to accommodate a fairly deep stack of cigarettes, for economy in handling.

When the cigarettes being collected are plain, they tend to lie horizontally in an orderly arrangement. When tipped cigarettes are being collected, however, difficulties may arise on account of the difference in thickness and hardness between the tipped and untipped parts of the cigarettes. Since the tipped ends are slightly thicker and also harder than the untipped ends, there is a progressive tendency for the top layer of the stack to be tilted. If this tilting becomes very pronounced it causes difficulty in feeding further cigarettes on to the stack, and further, it causes difficulty in pushing the cigarettes from the receptacle into the container or tray, because the upper layers of the cigarettes being pushed may tend to fall forward (i.e. sideways of the stack) during the pushing operation.

According to the present invention there is provided collecting apparatus for cigarettes, in which cigarettes are fed downwardly into a stationary receptacle to form a stack therein, comprising transfer means arranged periodically to transfer a stack of cigarettes from the receptacle into an adjacent container, and means operative in timed relationship with the transfer means to move the container so that different parts of the container are in succession positioned in register with the receptacle so that successive stacks are transferred into said different parts of the container.

By means of this arrangement the stack of cigarettes in the receptacle can be restricted to a relatively small size so as to reduce the tendency of tipped cigarettes to tilt as explained above, while at the same time the container can be of such a size as to accommodate a large quantity of cigarettes.

The apparatus may comprise a support for the container, and the said means to move the container may comprise means to move the support downwardly so as to lower the container from a position at which cigarettes can be transferred into its lower part, to a position at which cigarettes can be transferred into its upper part to rest on cigarettes in the said lower part.

The container may be vertically divided into compartments, the said means to move the container comprising means to push the container lengthwise so as to bring the said compartments successively into register with the receptacle.

The means to push the container lengthwise may be arranged to slide the container along the support after the lower part of one compartment has received cigarettes from the receptacle, and to slide it in the opposite direction after the support has moved downwardly and the upper and lower parts of another compartment have received cigarettes from the receptacle.

The means to move the support downwardly may comprise a chain and sprocket drive arranged to be driven in opposite directions at desired times through cam-actuated clutches.

The transfer means may comprise a reciprocating pusher arranged to move through the receptacle, means arranged yieldingly to urge the pusher forward in a pushing stroke, a latch device to restrain the pusher against foward movement, cam-operated means to trip said latch device at desired times, and a member arranged to be moved continuously back and forth so as to engage and return the pusher immediately after a pushing stroke.

Apparatus in accordance with the invention will now be described by way of example with reference to the accompanying drawings, in which:

FIGURES 1, 2 and 3 are sectional end views showing three stages in the filling of a container, FIGURES 4, 5, 6 and 7 are schematic side views illustrating the transfer of four successive batches of cigarettes from the receptacle to the container, FIGURE 8 is an end view similar to FIGURES 1-3 but showing operating mechanism, FIGURE 9 is a diagrammatic view showing driving arrangements, FIGURE 10 shows a detail of FIGURE 9, FIGURE 11 is a front elevation of mechanism for moving a container lengthwise, FIGURES 12 and 13 are schematic views showing the transfer of two successive batches of cigarettes from the receptacle to a container, as an alternative to the system illustrated in FIGURES 4-7, FIGURE 14 is a diagrammatic view similar to FIGURE 9 but showing alternative arrangements, and FIGURE 15 is an end view of a modified arrangement for operating a pusher.

The collecting mechanism comprises a collecting station or hopper 1 into which cigarettes are received from paddle-wheels 2 which receive them from a catcher band 3 and lower them into the hopper. A row of pins 4, forming a grill, is reciprocated sideways so as to assist in arranging the cigarettes parallel to one another.

A row of needles 5 is arranged to be projected at times through an aperture in a side wall 6, in order to penetrate the ends of the cigarettes which happen to register with the needles at such times, and thereby prevent them from moving downwardly. A plate 5a is arranged to be moved into the position in which it is shown in FIGURES 2 and 3 in order to support the cigarettes engaged by the needles and take the weight of the stack of cigarettes above them in the hopper.

The apparatus briefly described so far is in all its essentials the same as that described in the above-mentioned specification with reference to FIGURES 7, 8 and 9 of the drawings accompanying that specification.

Beneath the hopper 1 is a receptacle 7 which is open at both sides but has end walls 8 and a movable bottom wall in the form of a platform 9 which is arranged to move up and down between the end walls.

A pusher 10 is arranged to be moved from the position it occupies in FIGURE 1 to that shown in FIGURE 2, to push cigarettes from the receptacle, and back again.

A container 11, having end walls 12, a base 13, one side wall 14, and a vertical partition 15 which divides the container into two compartments, is stationed adjacent the receptacle 8 to receive batches of cigarettes therefrom, and supported on a movable support 16. The support is arranged for upwards and downwards movement, and means are provided to move the container lengthwise along the support, so that the container is moved lengthwise from the position shown in FIGURE 4 to that shown in FIGURE 5, downwards to the position shown in FIGURE 6, and again lengthwise to the position shown in FIGURE 7, thus enabling the container to be filled in four stages.

FIGURES 8 and 9 illustrate mechanism whereby the platform 9, the needles 5, the support plate 5a and the pusher plate 10 are operated automatically in proper sequence.

The platform 9, which is shown somewhat diagrammatically in FIGURES 1, 2 and 3, is fixed to a bracket 20, FIGURE 8, which is adjustably mounted on a support 21. The support 21 is movable up and down in vertical guides 23, wheels 24 on the support running along grooves in the guides 23.

The support 21, and hence the platform 9, is urged upwardly by springs 25 coiled on spools 26 mounted on the support. The arrangements for lowering the platform and then allowing it to move upwardly are as described in the specification referred to above, and comprise a chain fixed at one end to the support 21 and at the other end to a lever which is swung by a cam 27, see FIGURE 9. The cam 27 makes one revolution for each pushing stroke of the pusher 10.

The needles 5, the support plate 5a, and the pusher 10 are all caused to move into and out of operation by three cams which rotate in unison in timed relationship with the cam 27. The cam 27 rotates slowly in order to lower the platform 9 slowly, but it is desirable that the needles, support plate and pusher should operate relatively quickly. Accordingly the cams which control the needles, support plate and pusher rotate six times as fast as the cam 27, but means are provided, as will shortly be described, to make these three cams inoperative except at every sixth revolution, so as to allow the needles, support plate and pusher to operate once during each revolution of the cam 27.

The needles 5 are carried by a bar 28 which is connected by links 29 to levers 30 pivoted at 31, FIGURE 8. An arm 32 of one of the levers 30 is connected by a link 33 to a lever 34 pivoted at 35. The lever 34 is double-armed, and carries a roller 36 which rides on a cam 37 mounted on a shaft 38.

The mounting for the support plate 5a is very similar. In this case the plate is mounted on a bar 39 which is linked by links 40 to levers 41 pivoted at 42, and arm 43 on one of the levers 41 being connected by a link 44 to a double-armed lever 45 pivoted at 46 and carrying a roller 47 which rides on a cam 48.

The pusher plate 10, instead of being carried by a push-rod as shown in FIGURES 1, 2 and 3, is fixed to a forked member 49 to which are secured a pair of wheeled runners 50 arranged to run in horizontal guides 51.

A rod 52 extending from one side to the other of the forked member 49 has fixed to it a block 53 which is slidable in a slot formed in one end of a lever 54 pivoted at 55 and having an arm 56 which carries a roller 57. The roller 57 rides on a cam 58.

The three cams 37, 48 and 58 are all mounted on the shaft 38, and, as mentioned above, rotate at six times the speed of the cam 27, FIGURE 9. The bars carrying the needles 5 and the plate 5a respectively, and the member 49 carrying the pusher plate 10, are all yieldingly urged forwardly by suitable means (not shown), so that the rollers 36, 47 and 57 are yieldingly urged against their respective cams. In order to prevent the needles, support plate and pusher from moving forwardly except once during each cycle of operations, a rock-shaft 59, FIGURES 8 and 9, is provided with an arm 60 having a catch 61 which can engage a similar catch 62 on one of the runners 50, and also with an arm 63 having two catches 64 which can engage with similar catches 65 on extensions 134, 145 of the levers 34 and 45. When the shaft 59 is in the angular position shown in FIGURE 8 and the catches mentioned above are in engagement, the pusher 10 is prevented from moving forwardly, and the cam rollers 36 and 47 are held in the positions shown, thus preventing the needles 5 and the support plate 5a from moving inwardly.

The shaft 59 also carries an arm 66, FIGURE 9, which has a roller arranged to ride on a crown cam 67 mounted on a shaft 68. The cam 27 is also fixed on the shaft 68, and thus the two cams 27 and 67 rotate in unison. The crown cam 67 has a projection 69 which turns the arm 66 once every revolution of the cam, thereby rocking the shaft 59 and moving the catches 61 and 64 so as to permit the needles 5, the plate 5a, and the pusher 10 to be moved forwardly under the control of the cams 37, 48 and 58.

The shaft 38 has fixed to it a bevel gear 70 (FIGURE 9) which meshes with a further bevel gear 71 on a shaft 72.

The shaft 72 also carries a gear 73, which through a train of gears 74, 75, and 76, drives the shaft 68 at an angular speed one-sixth of that of the shaft 38. The shaft 72 is itself driven by a chain and sprocket drive from a shaft 77, which in turn is driven by an electric motor 78 through suitable reduction gearing contained in a gear box 79, and through a clutch 80.

It is important that a substantial quantity of cigarettes should be maintained at the collecting station above the level of the needles 5, and to ensure this, a photo-electric cell 81 and an electric lamp 82, shown diagrammatically in FIGURE 9, are provided at a suitable level on opposite sides of the space into which the cigarettes are fed. The photo-electric cell 81 is suitably connected to the clutch 80 in such a way as to cause the clutch to be broken if the cell is energised by a light beam from the lamp 82. As long as the light beam is obscured by cigarettes, the clutch is engaged and the operations described above proceed cyclically.

The support 16 is mounted on chains 83, FIGURE 8, passing about sprockets 84, see also FIGURE 9, the lower pair of which is mounted on a shaft 85. A gear 86 on the shaft 85 engages a gear 87 which is arranged to be rotated in opposite directions by gears 88 and 89 which are arranged to be driven through clutches 90 and 91. The drive to the two clutches is transmitted from the gear-box 79 by a worm 92, wormwheel 93, and gears 94 and 95.

The clutches 90 and 91 are arranged to be engaged and disengaged in proper sequence so that the shaft 85 is rotated in one direction or the other to raise or lower the support 16 at the proper times. For this purpose the clutches are normally disengaged and are arranged to be engaged only when electric contacts 96 and 97 are closed by cams 98 and 99 mounted on a shaft 100. The latter shaft is driven through gears 101 and 102 from the shaft 68.

As stated above, the cam 27 and shaft 68 make one revolution for each pushing stroke of the pusher 10. Since the container 11 is filled in four stages, the cam 27 makes four revolutions during the filling of the container. During this period the container on the support 16 is lowered, and the support 16 is raised again, and it is thus necessary for the cams 98 and 99 each to make one revolution for each revolution of the cam 27 and shaft 68, so that the clutches 90 and 91 will each be engaged at the proper time. For this reason the gear 101 has four times as many teeth as the gear 102.

In addition to the means for lowering and raising the support 16, means are provided to push the container 11 lengthwise along the support from the position shown in FIGURE 4 to that shown in FIGURES 5 and 6, and then back again, FIGURE 7. This latter means comprises a pair of arms 103 and 104, FIGURE 11, joined by a link 105, which carries rollers 106 to engage opposite ends of the container. The arms are pivoted at 107 and 108. A pin 109 on the arm 103 engages in a slot in a lever 110 fixed on a shaft 111, to which is also fixed a lever 112. A cam 113 having an eccentric cam track 114 is mounted on a shaft 115 which projects through a slot 116 in a rod 117 which is pivoted to the lever 112 and carries a roller 118 which engages in the cam track 114, whereby rotation of the cam causes the levers 112 and 110 to be rocked to and fro. This in turn causes the arms 103 and 104 to be rocked so as to push the container 11 to and fro on the support 16.

The arrangements for effecting these movements at the proper times are shown in FIGURE 9. The cam 113 is driven through a clutch 118 and bevel gears 119, 120 from the shaft 38. As stated above, the shaft 38 rotates at six times the speed of the cam 27 and shaft 68, and thus if the cam 113 were continuously driven the arms 103, 104 would be rocked back and forth six times for each pushing stroke of the pusher 10. The clutch 118 is, however, normally disengaged and is only engaged at the proper times when it is desired that the container 11 should be shifted lengthwise. This is determined by a cam 121 on the shaft 100 (which as mentioned above makes one revolution during the whole operation of filling the container 11) which cam is arranged to engage and close a pair of electrical contacts 122, by means of which the clutch 118 is engaged, for a suitable period of time twice during each revolution of the cam.

It will now be convenient to describe the operation of the apparatus so far described.

It will be assumed that the hopper 1 is filled with cigarettes which are supported on the platform 9 in the form of a stack. The needles 5 and the platform 9 are in the positions shown in FIGURE 1, and the cigarettes supported by the platform are therefore free to move down into the receptacle when the platform is lowered. As the platform slowly descends, more cigarettes are fed into the hopper, and the stack thus grows in depth, although its upper lever remains above the level of the pins 4, which by their reciprocatory movement tend to straighten out any misaligned cigarettes.

Shortly before the platform 9 reaches its lowermost position, shown in dot and dash lines in FIGURE 1, and in full lines in FIGURES 2, 3 and 8, the shaft 59 is rocked and the catches 61 and 64 are thereby disengaged. Thus the needles 5 move inwardly to the position shown in FIGURE 2, and the plate 5a is shortly afterwards moved in to support the cigarettes engaged by the needles. The platform continues to descend until it reaches its lowermost position. The cigarettes supported by the platform 9 are now separated from those above the plate 5a.

The platform comes to rest, and the pusher 10 moves through the receptacle to the position shown in FIGURE 2, pushing before it the batch of cigarettes stacked on the platform beneath the needles 5 and plate 5a, and transferring them into the lower part of one compartment of the container 11, as illustrated in FIGURES 2 and 4.

The pusher is then withdrawn by the cam 58, the cam 121 closes the contacts 122 thus engaging the clutch 118 for a sufficient time for the cam 113 to rotate through half a revolution, and the container 11 is thus moved by the arms 103, 104 lengthwise to the position shown in FIGURE 5, (the arms 103, 104 moving to their dot and dash line position, FIGURE 11) the platform 9 meanwhile being returned by the springs 25 to its uppermost position. The plate 5a and the needles 5 are withdrawn by the cams 37 and 48, and cigarettes again move down on to the platform and are lowered into the receptacle to be pushed into the lower part of the other compartment of the container as illustrated in FIGURE 5.

Engagement of the appropriate one of the clutches 88, 89 then causes the shaft 85 to be rotated so as to cause the support 16 and the container 11 to be lowered to the position shown in FIGURE 3, and the next batch of cigarettes to be pushed out of the receptacle in the manner already described occupies the upper part of one compartment of the container, as illustrated in FIGURE 6, and rests on those occupying the lower part. Filling of the container is completed by moving the container lengthwise to the position shown in FIGURE 7 and transferring a batch of cigarettes into the upper part of the first-mentioned compartment. This movement is effected by the cam 121 again closing the contacts 122 to engage the clutch 118 for a further half revolution of the cam 113 so as to rock the arms 103 back to their full line positions in FIGURE 11.

The filled container is then removed, either by hand or mechanically, and replaced by an empty one, and the operations described above are repeated.

It will be noted that in FIGURE 1 the platform 9 is shown slightly tilted. This is to assist in neutralising the tilting effect on the cigarettes caused by the extra thickness of the tipped ends, which in the arrangement shown are disposed at that side of the receptacle nearer the pusher. The platform may be spring-urged upwardly into its tilted position, and in that case it is pressed into horizontal position by the lower edge of the pusher 10 passing over it when cigarettes are pushed out of the receptacle. If desired the end walls 8 may also be tilted so as to leave more room for tipped ends than for the untipped ends, as described in the complete specification of copending United States patent application Serial No. 690,475.

FIGURES 12, 13 and 14 illustrate an alternative arrangement in which the container 11 is filled in two stages instead of four. For this purpose the partition 15, FIGURES 4-7 and 9, is omitted, and the hopper 1, receptacle 7 and pusher 10 extend the whole length of the container. In this arrangement, of course, there is no need to move the container lengthwise, and the mechanism shown in FIGURES 9 and 11 for this purpose is omitted, but the support 16 is lowered, to lower the container 11, and then returned, in the manner already described.

FIGURES 12 and 13 show diagrammatically the two stages of filling the container 11, and are similar to FIGURES 4-7.

FIGURE 14 is similar to FIGURE 9, but shows the container 11 without a central partition, and the hopper, extending the length of the container, and also omits the driving mechanism for pushing a container lengthwise. In addition, FIGURES 14 and 15 show certain modifications of the arrangement shown in FIGURES 8 and 9, which will now be described.

The catches 64, FIGURE 8, which hold the levers 34 and 45, and their cam rollers 36 and 47, in the position shown in FIGURE 8, and thus prevent the needles 5 and plate 5a from moving into the receptacle, are in the modified arrangement shown in FIGURE 14 tripped by solenoids 130 and 131 which are energised at appropriate times by cams 132 and 133 engaging contacts 136 and 137.

The pusher 10, instead of being operated directly from a cam as in the arrangement according to FIGURE 8, is pulled forward by a weight 138, FIGURE 15, connected by a chain or the like to the member 49 which carries the pusher, and is returned by means of levers 139 carrying rollers 140 which engage projections on the member 49. In order to impart a rapid movement to the pusher at the proper times, the lever arms 139 are rocked to and fro continuously, but the member 49 is held against forward movement by a catch 141 engaging a catch 142 on the member 49. The catch 141 is formed on a pivoted lever 143 which at appropriate times is momentarily turned about its pivot by a solenoid 144 so as to trip the catch and thereby release the member 49 and pusher plate 10. The solenoid is energised at suitable times by a cam 146, FIGURE 14, momentarily engaging contacts 147.

The levers 139 are rocked by cranks 150 which are rotated by gears 151 driven by gears 152 on the shaft 38.

This arrangement enables the pusher to move through the receptacle and back very rapidly.

It will be seen that the operation of the apparatus described with reference to FIGURES 12 to 15 is very similar to that of the apparatus previously described, but is simplified by the arrangement whereby the container is filled in two stages instead of four. Thus the support 16, FIGURE 8, is first located at the position it occupies in FIGURE 8, and the cigarettes occupying the receptacle 7 when the platform 9 reaches its lowest position are pushed into the lower half of the container 11. Then the shaft 85 is rotated to lower the support 16 and container 11, and when the receptacle 7 is again full, the cigarettes are pushed from it into the upper half of the container. The container is then removed and the shaft 85 is rotated in the opposite direction to raise the support, on to which an empty container is placed ready for the next cycle of operations.

What I claim as my invention and desire to secure by Letters Patent is:

1. Collecting apparatus for cigarettes, comprising in combination a stationary open-sided and open-topped receptacle having opposed end walls, means to feed cigarettes into the receptacle from above so that they move downwardly through the receptacle and accumulate on one another to form a stack confined within the receptacle by said end walls, a pusher adjacent one open side of the receptacle, movable support means adjacent the other open side of the receptacle, said support means being arranged to support a container in a plurality of different positions, means to move the said support means from one said position, through a distance at least equal to the height of a stack consisting of a substantial number of layers of cigarettes, to the next said position, the said one position and the said next position being such that a lower part and an upper part respectively of the container are successively positioned in register with a stack in the receptacle, pusher actuating means to cause the pusher to move through the receptacle after a stack has been formed therein to transfer the stack into the container, and means operative, after a stack has been pushed into a lower part of the container, to move the support means downwardly and thereby bring an upper part of the container into register with the next stack to be formed in the receptacle.

2. Collecting apparatus for cigarettes, comprising in combination a stationary open-sided and open-topped receptacle having opposed end walls, means to feed cigarettes into the receptacle from above so that they move downwardly through the receptacle and accumulate on one another to form a stack confined within the receptacle by said end walls, a pusher adjacent one open side of the receptacle, support means adjacent the other open side of the receptacle, said support means being arranged to support a container which is vertically divided into compartments, and being arranged to support the container at a plurality of different levels, means to move the said support means from one said level, through a distance equal to the height of a stack consisting of a substantial number of layers of cigarettes, to the next level, pusher actuating means to cause the pusher to move through the receptacle after a stack has been formed therein to transfer the stack into one compartment of the container, and means operative, after a stack has been pushed into said one compartment at one said level of the support means, to push the container in a direction transverse to the directions of movement of the pusher and of the support means so as to bring another compartment into register with the receptacle while the support means remains at the said one level.

3. Collecting apparatus for cigarettes, comprising in combination a stationary open-sided and open-topped receptacle having opposed end walls, means to feed cigarettes into the receptacle from above so that they move downwardly through the receptacle and accumulate on one another to form a stack confined within the receptacle by said end walls, a pusher adjacent one open side of the receptacle, movable support means adjacent the other open side of the receptacle, said support means being arranged to support a container in a plurality of different positions, means to move the said support means from one said position, through a distance at least equal to the height of a stack consisting of a substantial number of layers of cigarettes to the next said position, the said one position and the said next position being such that a lower part and an upper part respectively of the container are successively positioned in register with a stack in the receptacle, pusher actuating means to cause the pusher to move through the receptacle after a stack has been formed therein to transfer the stack into the container, and means operative, after a stack has been pushed into a lower part of the container, to move the support means downwardly and thereby bring an upper part of the container into register with the next stack to be formed in the receptacle, the said means to move the support downwardly comprising a chain and sprocket drive arranged to be driven in opposite directions at desired times through cam actuated clutches.

4. Collecting apparatus for cigarettes, comprising in combination a stationary open-sided and open-topped receptacle having opposed end walls, means to feed cigarettes into the receptacle from above so that they move downwardly through the receptacle and accumulate on one another to form a stack confined within the receptacle by said end walls, support means adjacent an open side of the receptacle to support a container in register with the receptacle, a reciprocating pusher adjacent the other open side of the receptacle and arranged to move through the receptacle to transfer a stack into the container, means arranged yieldingly to urge the pusher forward in a pushing stroke, a latch device to restrain the pusher against forward movement, cam operated means to trip said latch at desired times, and a member arranged to be moved continuously back and forth in timed relationship with the said means to trip the latch and to move through a plurality of cycles for each pushing stroke of the pusher and arranged to engage and return the pusher on the next backward movement of said member immediately after a pushing stroke.

5. Collecting apparatus for cigarettes, comprising in combination a stationary open-sided and open-topped receptacle having opposed end walls, means to feed cigarettes into the receptacle from above so that they move downwardly through the receptacle and accumulate on one another to form a stack confined within the receptacle by said end walls, a pusher adjacent one open side of the receptacle, movable support means adjacent the other open side of the receptacle, said support means being arranged to support a container in a plurality of different positions, means to move the said support means from one said position, through a distance at least equal to the height of a stack consisting of a substantial number of layers of cigarettes, to the next said position, the said one position and the said next position being such that a lower part and an upper part respectively of the container are successively positioned in register with a stack in the receptacle, pusher actuating means to cause the pusher to move through the receptacle after a stack has been formed therein to transfer the stack into the container, means operative, after a stack has been pushed into a lower part of the container, to move the support means downwardly and thereby bring an upper part of the container into register with the next stack to be formed in the receptacle, and a platform to support a stack of cigarettes in the receptacle, said platform being arranged to be tilted so as to slope from one side of the receptacle to the other to provide more room in that side of the receptacle at which tipped ends of cigarettes are located than at the opposite side.

6. Collecting apparatus for cigarettes, comprising in combination a stationary open-sided and open-topped receptacle having opposed end walls, means to feed cigarettes into the receptacle from above so that they move downwardly through the receptacle and accumulate on one another to form a stack confined within the receptacle by said end walls, a pusher adjacent one open side of the receptacle, movable support means adjacent the other open side of the receptacle, said support means being arranged to support a container in a plurality of different positions, means to move the said support means from one said position, through a distance at least equal to the height of a stack consisting of a substantial number of layers of cigarettes, to the next said position, the said one position and the said next position being such that a lower part and an upper part respectively of the container are successively positioned in register with a stack in the receptacle, pusher actuating means to cause the pusher to move through the receptacle after a stack has been formed therein to transfer the stack into the container, and means operative, after a stack has been pushed into a lower part of the container, to move the support means downwardly and thereby bring an upper part of the container into register with the next stack to be formed in the receptacle, wherein the said end walls are arranged to be tilted so as to provide more room in that side of the receptacle at which tipped ends of the cigarettes are located than at the opposite side.

References Cited in the file of this patent

UNITED STATES PATENTS

| | | |
|---|---|---|
| 952,352 | Pieper | Mar. 15, 1910 |
| 1,447,715 | Ekstrom et al. | Mar. 6, 1923 |
| 1,770,901 | Dietmann | July 22, 1930 |
| 1,964,084 | Rundell | June 26, 1934 |
| 2,592,642 | Bardet | Apr. 15, 1952 |
| 2,683,557 | Jenney | July 13, 1954 |
| 2,737,327 | Wilson et al. | Mar. 6, 1956 |
| 2,743,563 | Jorgensen et al. | May 1, 1956 |

FOREIGN PATENTS

| | | |
|---|---|---|
| 541,190 | Canada | May 21, 1957 |